United States Patent
Prest et al.

(10) Patent No.: US 10,131,022 B2
(45) Date of Patent: Nov. 20, 2018

(54) METHODS AND SYSTEMS FOR FORMING A GLASS INSERT IN AN AMORPHOUS METAL ALLOY BEZEL

(75) Inventors: Christopher D. Prest, San Francisco, CA (US); Matthew S. Scott, San Jose, CA (US); Stephen P. Zadesky, Portola Valley, CA (US); Richard W. Heley, Palo Alto, CA (US); Dermot J. Stratton, San Francisco, CA (US); Joseph C. Poole, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 991 days.

(21) Appl. No.: 14/396,265

(22) PCT Filed: Apr. 23, 2012

(86) PCT No.: PCT/US2012/034680
§ 371 (c)(1),
(2), (4) Date: Jan. 14, 2015

(87) PCT Pub. No.: WO2013/162504
PCT Pub. Date: Oct. 31, 2013

(65) Prior Publication Data
US 2015/0121677 A1    May 7, 2015

(51) Int. Cl.
*B23P 19/04* (2006.01)
*B22D 19/04* (2006.01)
(Continued)

(52) U.S. Cl.
CPC .............. *B23P 19/04* (2013.01); *B22D 19/04* (2013.01); *C03C 27/00* (2013.01); *C03C 27/04* (2013.01);
(Continued)

(58) Field of Classification Search
CPC ......... C03C 27/04; C03C 27/00; C22C 1/002; C22C 45/10; B23P 19/04; B22D 19/04;
(Continued)

(56) References Cited

U.S. PATENT DOCUMENTS 4,571,456 A    2/1986   Paulsen et al.
4,762,677 A *  8/1988   Dolgin .................... B22F 3/007
                                               419/10

(Continued)

FOREIGN PATENT DOCUMENTS

CN       1526030      9/2004
DE       10053199     5/2001
(Continued)

OTHER PUBLICATIONS

International Search Report and Written Opinion dated Oct. 23, 2015, PCT/US2012/034680, 19 pages.
(Continued)

*Primary Examiner* — Bayan Salone
(74) *Attorney, Agent, or Firm* — Dorsey & Whitney LLP

(57) ABSTRACT

Methods and apparatus for creating an integral assembly formed from a transparent member and a housing formed at least in part of a bulk-solidifying amorphous alloy. The methods and systems create integral transparent member and amorphous metal alloy-containing parts using thermoplastic molding techniques in which the amorphous metal is molded to the transparent member in a thermoplastic, not liquid, state.

27 Claims, 7 Drawing Sheets

(51) Int. Cl.
*C22C 1/00* (2006.01)
*C22C 45/10* (2006.01)
*C03C 27/00* (2006.01)
*C03C 27/04* (2006.01)
*G06F 1/16* (2006.01)

(52) U.S. Cl.
CPC .............. *C22C 1/002* (2013.01); *C22C 45/10* (2013.01); *G06F 1/1626* (2013.01); *G06F 1/1637* (2013.01); *Y10T 29/4998* (2015.01); *Y10T 29/49865* (2015.01); *Y10T 29/49908* (2015.01)

(58) Field of Classification Search
CPC .................. G06F 1/1626; G06F 1/1637; Y10T 29/49865; Y10T 29/49908; Y10T 29/4998
USPC ............................ 29/447, 505, 527.1; 164/98
See application file for complete search history.

(56) References Cited

U.S. PATENT DOCUMENTS

| | | | |
|---|---|---|---|
| 5,237,486 A | 8/1993 | LaPointe et al. | |
| 5,288,344 A | 2/1994 | Peker et al. | |
| 5,324,368 A | 6/1994 | Masumoto et al. | |
| 5,368,659 A | 11/1994 | Peker et al. | |
| 5,618,359 A | 4/1997 | Lin et al. | |
| 5,722,055 A | 2/1998 | Kobayashi et al. | |
| 5,735,975 A | 4/1998 | Lin et al. | |
| 5,896,642 A | 4/1999 | Peker et al. | |
| 6,325,868 B1 | 12/2001 | Kim et al. | |
| 6,771,490 B2 | 8/2004 | Atakan et al. | |
| 6,914,773 B2 | 7/2005 | Yang et al. | |
| 6,996,425 B2 | 2/2006 | Watanabe | |
| 7,224,945 B2 | 5/2007 | Gartrell | |
| 7,228,157 B2 | 6/2007 | Lee | |
| 7,330,743 B2 | 2/2008 | Hutchison et al. | |
| 7,575,040 B2 | 8/2009 | Johnson | |
| 7,618,499 B2 | 11/2009 | Johnson et al. | |
| 7,684,178 B2 | 3/2010 | Hsu et al. | |
| 7,806,997 B2 | 10/2010 | Demetriou et al. | |
| 7,974,660 B2 | 7/2011 | Hsu et al. | |
| 8,060,168 B2 | 11/2011 | Horrdin et al. | |
| 8,086,285 B2 | 12/2011 | McNamara et al. | |
| 8,086,291 B2 | 12/2011 | Maenpaa et al. | |
| 8,346,183 B2 * | 1/2013 | Prest ................. | B29C 45/14336 361/679.3 |
| 8,480,864 B2 | 7/2013 | Farmer et al. | |
| 8,529,712 B2 | 9/2013 | Demetriou et al. | |
| 8,738,104 B2 * | 5/2014 | Yeates ................... | B22D 19/04 361/679.3 |
| 9,148,972 B2 | 9/2015 | Yeates | |
| 9,174,415 B2 * | 11/2015 | Gong .................... | B22D 19/08 |
| 9,716,050 B2 | 7/2017 | Pham et al. | |
| 2005/0000599 A1 | 1/2005 | Liebermann et al. | |
| 2005/0031853 A1 | 2/2005 | Tachibana | |
| 2006/0086476 A1 * | 4/2006 | Peker ....................... | B22C 9/04 164/122 |
| 2008/0034796 A1 * | 2/2008 | Muramatsu ........... | B21D 37/01 65/60.1 |
| 2008/0227507 A1 | 9/2008 | Joo | |
| 2009/0017263 A1 * | 1/2009 | Yeates .................... | B22D 19/04 428/167 |
| 2010/0014232 A1 | 1/2010 | Nishimura | |
| 2014/0090752 A1 * | 4/2014 | Waniuk ................ | B22D 27/006 148/241 |
| 2015/0360283 A1 | 12/2015 | Yeates | |

FOREIGN PATENT DOCUMENTS

| | | |
|---|---|---|
| EP | 0066537 | 12/1982 |
| GB | 1316403 | 5/1973 |
| GB | 1566543 | 5/1980 |
| GB | 1566696 | 5/1980 |
| JP | 53133061 | 11/1978 |
| JP | 02129307 | 5/1990 |
| JP | H0694848 | 4/1994 |
| JP | H06179069 | 6/1994 |
| JP | H06212205 | 8/1994 |
| JP | 2001030048 | 2/2001 |
| JP | 2001303218 | 10/2001 |
| JP | 2002011826 | 1/2002 |
| JP | 2002263821 | 9/2002 |
| JP | 2004190781 | 7/2004 |
| JP | 2004537417 | 12/2004 |
| JP | 2005509090 | 4/2005 |
| JP | 2005201789 | 7/2005 |
| JP | 2005209868 | 8/2005 |
| JP | 2006021400 | 1/2006 |
| JP | 2008214704 | 9/2008 |
| KR | 2007045768 | 5/2007 |
| WO | WO 84/002203 | 6/1984 |
| WO | WO 03/009088 | 1/2003 |
| WO | WO 03/012157 | 2/2003 |
| WO | WO 06/091875 | 8/2006 |
| WO | WO 06/138286 | 12/2006 |
| WO | WO 08/010917 | 1/2008 |
| WO | WO 11/103310 | 8/2011 |

OTHER PUBLICATIONS

Inoue et al., Bulk amorphous alloys with high mechanical strength and good soft magnetic properties in Fe-TM-B (TM=IV-VIII group transition metal) system, *Appl. Phys. Lett.*, 71 (4), 1977, pp. 464-466.

Shen et al., Bulk Glassy $Co_{43}Fe_{20}Ta_{5.5}B_{31.5}$ Alloy with High Glass-Forming Ability and Good Soft Magnetic *Properties*, *Materials Transactions*, vol. 42, No. 10, 2001, pp. 2136-2139.

* cited by examiner

METHODS AND SYSTEMS FOR FORMING A GLASS INSERT IN AN AMORPHOUS METAL ALLOY BEZEL

BACKGROUND

The embodiments relate to methods and systems for creating integral transparent member and amorphous metal alloy parts using thermoplastic molding techniques in which the amorphous metal is molded to the transparent member in a thermoplastic, not liquid, state.

During the manufacture of electronic devices such as cellular telephones, digital music players, and handheld computing devices, transparent components are often held within housings or the like. By way of example, many electronic devices have displays that include glass or plastic windows which are held by a metal housing. Typically, a metal frame or housing is formed, and a glass component or a plastic component is inserted into the formed frame or housing.

In order to properly secure a metal frame and a glass component together, the tolerances associated with the fit between the metal frame and the glass component must be strictly maintained. That is, the tolerance matches between the metal frame and the glass component are maintained such that the glass component may be inserted into the metal frame and held in place. An overall assembly that includes a metal frame and a glass component inserted therein may be held together by a press fit, using adhesive materials, and/or using mechanical structures such as screws. If the tolerance matches between the metal frame and the glass component are not strictly maintained, the integrity of the overall assembly may be compromised. For relatively small assemblies, maintaining critical tolerances between metal frames and glass components such that tolerance mismatches are unlikely to occur may be difficult.

Forming a metal bezel around a transparent member insert using die casting and metal injection molding techniques is known and described in U.S. Patent Application Publication No. 2009/0017263, the disclosure of which is incorporated by reference herein in its entirety. Use of liquid metal or metal alloys requires extremely high temperatures, and in the case of an amorphous alloy, also requires specified cooling rates to maintain the amorphicity of the alloy. These conditions require specific transparent members that can withstand the temperature of the melted metal, and the cooling rate, and could create stresses within the transparent member that might cause deformations or cracks, if certain amorphous metals requiring rapid cooling were utilized.

Forming an amorphous alloy frame for electronic hardware and flat panel displays is disclosed in U.S. Pat. No. 6,771,490, the disclosure of which is incorporated by reference herein in its entirety. The frame is formed and then the remaining components of the electronic device are attached thereto. Specifically, the overall assembly that includes the metal frame and optionally a glass or transparent component (and other electronic components) inserted therein are held together by a press fit, using adhesive materials, and/or using mechanical structures such as screws. If the tolerance matches between the metal frame and the other components are not strictly maintained, the integrity of the overall assembly may be compromised. For relatively small assemblies, maintaining critical tolerances between metal frames and glass components such that tolerance mismatches are unlikely to occur may be difficult.

Therefore, what is needed is a method and an apparatus that allows for the tolerances associated with a metal-based frame and a glass component, or a metal-based frame and a plastic component, to be substantially relaxed.

SUMMARY

An embodiment pertains to techniques that enable an assembly that includes a transparent member that is integrally formed with an amorphous metal alloy member. The embodiments may be implemented in numerous ways, including, but not limited to, as a method, system, device, or apparatus. Exemplary embodiments are discussed below.

According to one embodiment, a method includes preparing a housing made from at least a portion of a bulk-solidifying amorphous alloy, heating the housing to above its glass transition temperature but below its crystallization temperature, expanding the heated housing, positioning a transparent member within the expanded housing, contracting the housing around the transparent member, and cooling the housing and transparent member to form an integrally formed transparent member and amorphous metal alloy housing.

According to another embodiment, there is provided a method of forming an integrally formed transparent member and amorphous metal alloy housing that includes providing a band of bulk-solidifying amorphous alloy, and heating the band to a temperature above its glass transition temperature but below its crystallization temperature. The method also includes placing a transparent member in a mold apparatus, and then wrapping the heated band of bulk-solidifying amorphous alloy around the transparent member. The method further includes applying pressure to the heated band of bulk-solidifying amorphous alloy and transparent member to mold the band around the transparent member to form a bulk-solidifying amorphous alloy housing integral with a transparent member, and cooling the housing and transparent member to form an integrally formed transparent member and amorphous metal alloy housing.

According to another embodiment, a method includes preparing a housing made from at least a portion of a bulk-solidifying amorphous alloy, heating the housing to above its glass transition temperature but below its crystallization temperature, expanding the heated housing, providing a transparent member; providing an intermediate member positioned either around the transparent member or within the expanded heated housing, positioning a transparent member within the expanded housing such that the intermediate member is positioned between the transparent member and the housing, contracting the housing around the transparent member and intermediate member, and cooling the housing, transparent member, and intermediate member to form an integrally formed transparent member and amorphous metal alloy housing.

According to another embodiment, there is provided a method of forming an integrally formed transparent member and amorphous metal alloy housing that includes providing a band of bulk-solidifying amorphous alloy, and heating the band to a temperature above its glass transition temperature but below its crystallization temperature. The method also includes placing a transparent member in a mold apparatus, positioning an intermediate member either adjacent the heated amorphous alloy band, or around the transparent member, and then wrapping the heated band of bulk-solidifying amorphous alloy around the transparent member such that the intermediate member is positioned between the transparent member and the housing. The method further includes applying pressure to the heated band of bulk-solidifying amorphous alloy and transparent member to mold the band around the transparent member to form a bulk-solidifying amorphous alloy housing integral with a transparent member, and cooling the housing and transparent member to form an integrally formed transparent member and amorphous metal alloy housing.

Other features and advantages of the present disclosure will become apparent from the following detailed description, the accompanying drawings, and the appended claims.

BRIEF DESCRIPTION OF THE DRAWINGS

The invention will be readily understood by the following detailed description in conjunction with the accompanying drawings, in which.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
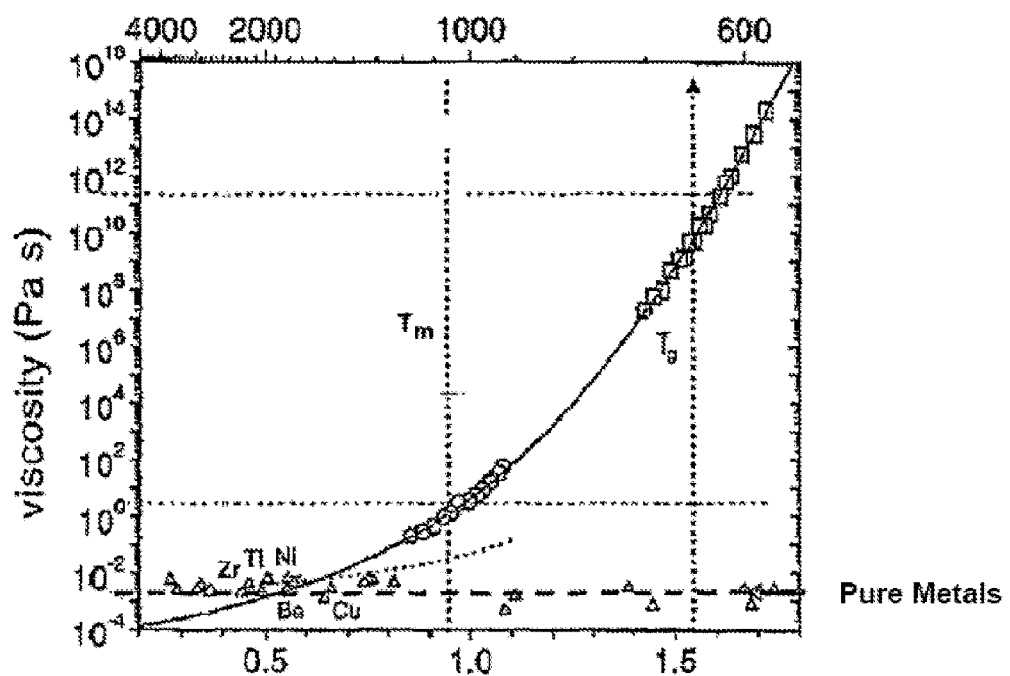
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
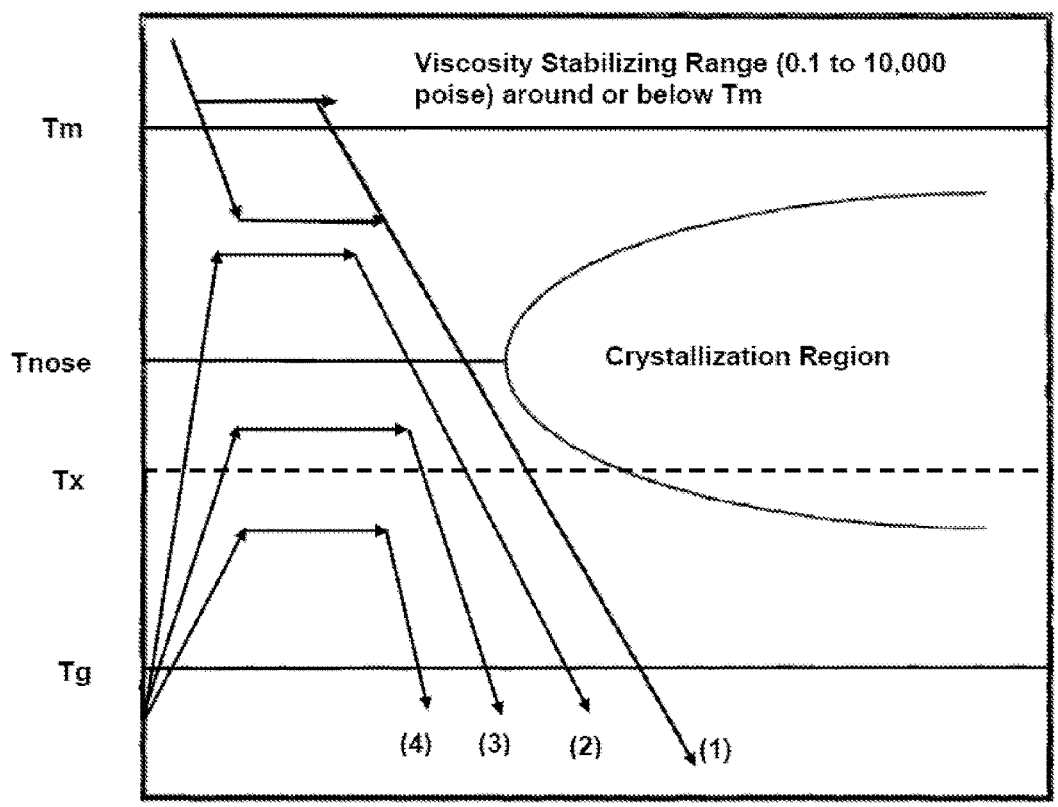
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between 1012 Pa s at the glass transition temperature down to 105 Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 2, Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula (Zr, Ti)a(Ni, Cu, Fe)b(Be, Al, Si, B)c, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula (Zr, Ti)a(Ni, Cu)b(Be)c, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula (Zr, Ti)a(Ni, Cu)b(Be)c, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula (Zr)a(Nb, Ti)b(Ni, Cu)c(Al)d, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 5 | Pt | Cu | Ag | P | B | Si | | |
| | 74.70% | 1.50% | 0.30% | 18.0% | 4.00% | 1.50% | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr | Ti | Cu | Ni | Be | |
| | 41.20% | 13.80% | 12.50% | 10.00% | 22.50% | |
| 2 | Zr | Ti | Cu | Ni | Be | |
| | 44.00% | 11.00% | 10.00% | 10.00% | 25.00% | |
| 3 | Zr | Ti | Cu | Ni | Nb | Be |
| | 56.25% | 11.25% | 6.88% | 5.63% | 7.50% | 12.50% |
| 4 | Zr | Ti | Cu | Ni | Al | Be |
| | 64.75% | 5.60% | 14.90% | 11.15% | 2.60% | 1.00% |
| 5 | Zr | Ti | Cu | Ni | Al | |
| | 52.50% | 5.00% | 17.90% | 14.60% | 10.00% | |
| 6 | Zr | Nb | Cu | Ni | Al | |
| | 57.00% | 5.00% | 15.40% | 12.60% | 10.00% | |
| 7 | Zr | Cu | Ni | Al | | |
| | 50.75% | 36.23% | 4.03% | 9.00% | | |
| 8 | Zr | Ti | Cu | Ni | Be | |
| | 46.75% | 8.25% | 7.50% | 10.00% | 27.50% | |

TABLE 2-continued

Additional Exemplary amorphous alloy compositions (atomic %)

| Alloy | Atm % | Atm % | Atm % | Atm % | Atm % | Atm % |
|---|---|---|---|---|---|---|
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)-C—B, Co—Cr—Mo-Ln-C—B, Fe—Mn—Cr—Mo—(Y,Ln)-C—B, (Fe, Cr, Co)—(Mo,Mn)—(C,B)—Y, Fe—(Co,Ni)—(Zr,Nb,Ta)—(Mo,W)—B, Fe—(Al,Ga)—(P,C,B,Si,Ge), Fe—(Co, Cr,Mo,Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is Fe72Al5Ga2P11C6B4. Another example is Fe72Al7Zr10Mo5W2B15. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Embodiments

Example embodiments of the present invention are discussed below with reference to the various figures. However, those skilled in the art will readily appreciate that the detailed description given herein with respect to these figures is for explanatory purposes, as the invention extends beyond these embodiments.

The use of a bulk-solidifying amorphous alloy to form the housing of an electronic device integrally with a transparent member provides unique processing advantages. The alloy can be heated to above its glass transition temperature and then thermoplastically deformed to accommodate the transparent member. Lower temperatures can be employed thereby avoiding undue strain on the transparent member that might result from melted metals or rapid cooling. In addition, the thermoplastic nature of the bulk-solidifying amorphous alloy allows more integral formation of the housing and transparent member.

In one embodiment the housing is formed first using any of the techniques disclosed in, for example, U.S. Pat. No. 6,771,490, and then heated and expanded. The transparent member then can be positioned within the expanded housing and the stress relieved, or stress applied in the opposite direction so that the housing contracts around the transparent member to form an integrated housing and transparent member. In another embodiment, a band of bulk-solidifying amorphous alloy can be heated and thermoplastically deformed around the transparent member and then cooled to form an integrated housing and transparent member. These techniques provide an improved fit between the housing and transparent member, while at the same time providing a housing that has the advantageous strength, hardness, and elongation characteristics of a bulk-solidifying amorphous alloy. The joint between the transparent member and housing can be further enhanced by using an intermediate member, either in the form of a gasket or thin foil seal, that can facilitate adequate bonding. The transparent member also can include protrusions or cavities around which or into which the bulk-solidifying amorphous alloy housing can be formed to provide an improved joint between the respective materials.

According to one embodiment, a method includes preparing a housing made from at least a portion of a bulk-solidifying amorphous alloy, heating the housing to above its glass transition temperature but below its crystallization temperature, expanding the heated housing, positioning a transparent member within the expanded housing, contracting the housing around the transparent member, and cooling the housing and transparent member to form an integrally formed transparent member and amorphous metal alloy housing.

According to another embodiment, there is provided a method of forming an integrally formed transparent member and amorphous metal alloy housing that includes providing a band of bulk-solidifying amorphous alloy, and heating the band to a temperature above its glass transition temperature but below its crystallization temperature. The method also includes placing a transparent member in a mold apparatus, and then wrapping the heated band of bulk-solidifying amorphous alloy around the transparent member. The method further includes applying pressure to the heated band of bulk-solidifying amorphous alloy and transparent member to mold the band around the transparent member to form a bulk-solidifying amorphous alloy housing integral with a transparent member, and cooling the housing and transparent member to form an integrally formed transparent member and amorphous metal alloy housing.

According to another embodiment, a method includes preparing a housing made from at least a portion of a bulk-solidifying amorphous alloy, heating the housing to above its glass transition temperature but below its crystallization temperature, expanding the heated housing, providing a transparent member; providing an intermediate member positioned either around the transparent member or within the expanded heated housing, positioning a transparent member within the expanded housing such that the intermediate member is positioned between the transparent member and the housing, contracting the housing around the transparent member and intermediate member, and cooling the housing, transparent member, and intermediate member to form an integrally formed transparent member and amorphous metal alloy housing.

According to another embodiment, there is provided a method of forming an integrally formed transparent member and amorphous metal alloy housing that includes providing a band of bulk-solidifying amorphous alloy, and heating the band to a temperature above its glass transition temperature but below its crystallization temperature. The method also includes placing a transparent member in a mold apparatus, positioning an intermediate member either adjacent the heated amorphous alloy band, or around the transparent member, and then wrapping the heated band of bulk-solidifying amorphous alloy around the transparent member such that the intermediate member is positioned between the transparent member and the housing. The method further includes applying pressure to the heated band of bulk-solidifying amorphous alloy and transparent member to mold the band around the transparent member to form a bulk-solidifying amorphous alloy housing integral with a transparent member, and cooling the housing and transparent member to form an integrally formed transparent member and amorphous metal alloy housing.

The properties of the bulk-solidifying amorphous alloy make it particularly suitable for the methods of the embodiments. The alloys have high hardness, high elongation providing an ability to stretch and return to its original shape without plastic deformation, high yield strength, and the difference between the glass transition temperature Tg, and crystallization temperature Tx, ($\Delta$T) is high, thus providing a large window for thermoforming the bulk-solidifying amorphous alloy. In one embodiment, the bulk-solidifying amorphous alloy housing can have a Vickers hardness of at least about 800 HV-100 gm, such as at least about 850 HV-100 gm, such as at least about 1000 HV-100 gm, such as at least about 1100 HV-100 gm, such as at least about 1200 HV-100 gm, such as at least about 1250 HV-100 gm, such as at least about 1300 HV-100 gm. In one embodiment, the bulk-solidifying amorphous alloy housing can have a yield strength of about 200 ksi or higher, such as 250 ksi or higher, such as 400 ksi or higher, such as 500 ksi or higher, such as 600 ksi or higher. In another embodiment, the bulk-solidifying amorphous alloy housing can have a very high elastic strain limit, such as at least about 1.2%, such as at least about 1.5%, such as at least about 1.6%, such as at least about 1.8%, such as at least about 2.0%.

The bulk-solidifying amorphous alloy useful in forming the housing preferably can have several characteristic temperatures, including glass transition temperature Tg, crystallization temperature Tx, and melting temperature Tm. In some embodiments, each of Tg, Tx, and Tm, can refer to a temperature range, instead of a discrete value; thus, in some embodiments the term glass transition temperature, crystallization temperature, and melting temperature are used interchangeably with glass transition temperature range, crystallization temperature range, and melting temperature range, respectively. These temperatures are commonly known and can be measured by different techniques, one of which is Differential Scanning calorimetry (DSC), which can be carried out at a heating rate of, for example, about 20° C./min.

In one embodiment, as the temperature increases, the glass transition temperature Tg of an amorphous alloy can refer to the temperature, or temperature ranges in some embodiments, at which the amorphous alloy begins to soften and the atoms become mobile. An amorphous alloy can have a higher heat capacity above the glass transition temperature than it does below the temperature, and thus this transition can allow the identification of Tg. With increasing temperature, the amorphous alloy can reach a crystallization temperature Tx, at which crystals begin to form. As crystallization in some embodiments is generally an exothermic reaction, crystallization can be observed as a dip in a DSC curve and Tx can be determined as the minimum temperature of that dip. An exemplary Tx for a Vitreloy can be, for example, about 500° C., and that for a platinum-based amorphous alloy can be, for example, about 300° C. For other alloy systems, the Tx can be higher or lower. It is noted that at the Tx, the amorphous alloy is generally not melting or melted, as Tx is generally below Tm.

Finally, as the temperature continues to increase, at the melting temperature Tm, the melting of the crystals can begin. Melting is an endothermic reaction, wherein heat is used to melt the crystal with minimal temperature change until the crystals are melted into a liquid phase. Accordingly, a melting transition can resemble a peak on a DSC curve, and Tm can be observed as the temperature at the maximum of the peak. For an amorphous alloy, the temperature difference $\Delta T$ between Tx and Tg can be used to denote a supercritical region (i.e., a "supercritical liquid region," or a "supercritical region"), wherein at least a portion of the amorphous alloy retains and exhibits characteristics of an amorphous alloy, as opposed to a crystalline alloy. The portion can vary, including at least 40 wt %, at least 50 wt %, at least 60 wt %, at least 70 wt %, at least 80 wt %, at least 90 wt %, at least 99 wt %; or these percentages can be volume percentages instead of weight percentages. In an embodiment, the temperature difference $\Delta T$ is within the range of from about 40 to about 250° C., or from about 65 to about 150° C., or from about 75 to about 110° C.

Because of the many different corners and angles required for most electronics housings and cases, the bulk-solidifying amorphous alloy materials should be formable for an extended period of time. Bulk-solidifying amorphous alloys retain their fluidity from above their melting temperatures down to glass transition temperatures, and as a consequence, they do not accumulate significant stress down to below glass transition temperature. Further, the solidification shrinkage of bulk-solidifying amorphous alloys is much less than solidification shrinkage of conventional metals. As such, these characteristics of bulk-solidifying amorphous alloys can be molded or cast to reproduce the highly complex shapes associated with electronics housings without deformation and without requiring costly post-formation fabrication steps.

Accordingly, in one embodiment, those bulk-solidifying amorphous having a $\Delta Tsc$ (supercooled liquid region) of more than 30° C. as determined by Differential Scanning calorimetry ("DSC") measurements at 20° C./min, or a $\Delta Tsc$ of more than 60° C., or a $\Delta Tsc$ of 90° C. or more, such that the material is capable of being formed at temperatures around the glass transition range for an extended period of time. The expression "around the glass transition range" denotes above the glass transition, slightly below the glass transition or at the glass transition, but is at least carried out below the crystallization temperature Tx. To ensure that the final product retains the high elastic limit of the bulk-solidifying amorphous alloy feedstock, the temperature and time of forming the integral housing should be carried out in accordance with the temperature maximums shown in the table below (temperature units are in ° C.).

Tmax is dependent on processing time. The value of Tmax could be determined as follows:
1) Perform a series of isothermal DSC scans (hold at constant temperature) on a sample at temperatures in the deltaT region (between Tg and Tx).
2) Determine time to crystallization in each scan (temperatures close to Tg will take a long time, temperatures close to Tx will be very quick).
3) Use this information to build an "on-heating" TTT curve for the alloy system.
4) Determine how long the forming process takes.
5) Choose a temperature based on TTT curve and forming/heating time.

This will be an iterative process. As T increases, viscosity decreases (allowing higher strain rates and shorter processing times).

Where Tmax is the maximum permissible temperature during the molding process, Tmax (Pr) is the preferred maximum permissible temperature, and Tmax (M. Pr) is the most preferred maximum permissible temperature during the molding process. In the above table, Tg, Tsc and Tx are determined from standard DSC scans at 20° C./min. Tg is defined as the onset temperature of glass transition, Tsc is defined as the onset temperature of super-cooled liquid region, and Tx is defined as the onset temperature of crystallization. $\Delta Tsc$ is defined as the difference between Tx and Tsc.

An Exemplary Consumer Electronics Device

Figure 3:
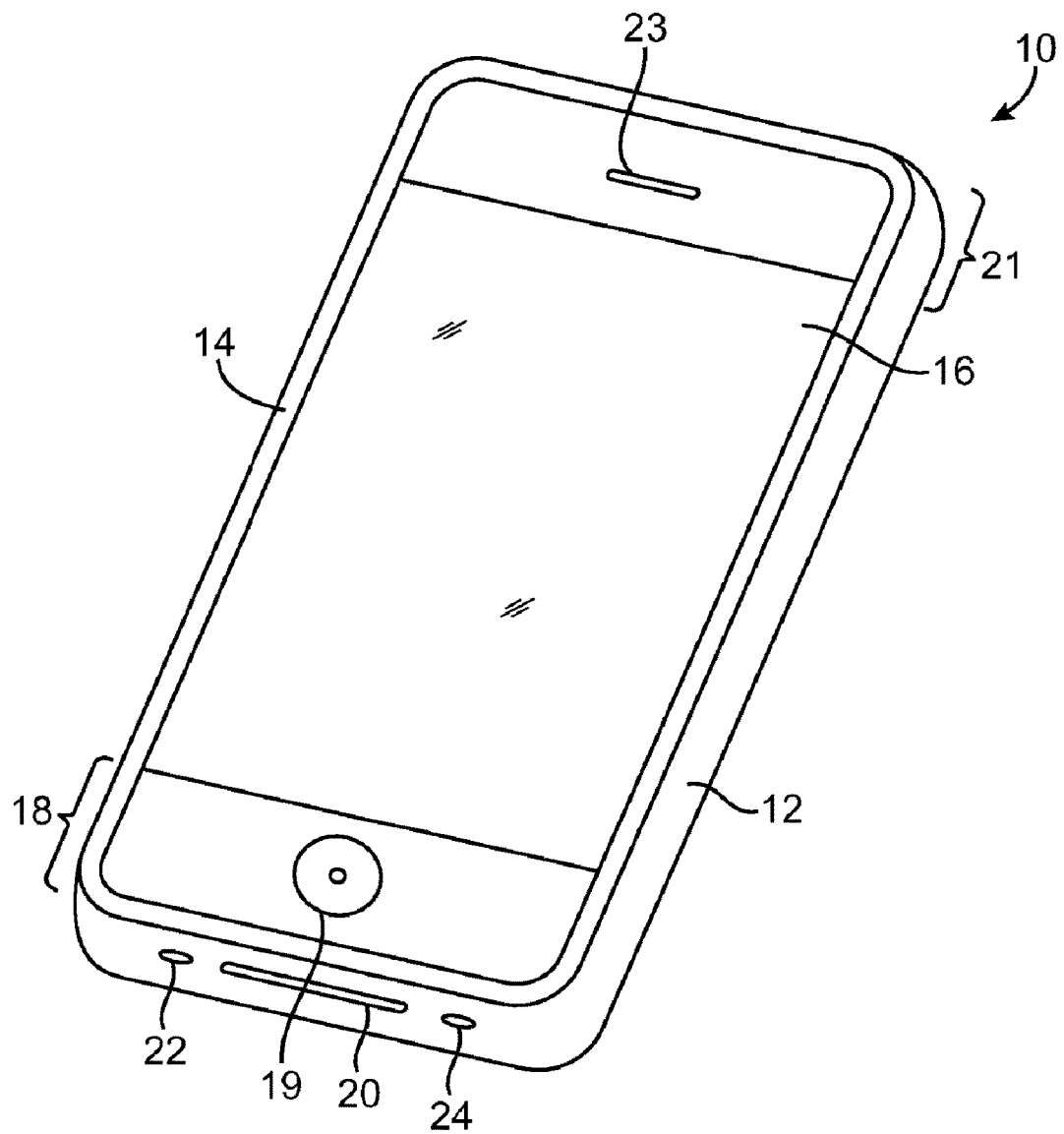
FIG. 3 shows a schematic of an illustrative portable electronic device in accordance with an embodiment of the present invention.

An illustrative portable electronic device in accordance with an embodiment of the present invention is shown in FIG. 3. While the device shown in FIG. 3 is a handheld electronic device such as a smart phone, the embodiments are useful with any electronic device that has a transparent member. It should be understood that the housing described herein may take any shape and size suitable for enclosing and protecting the electronic components of an electronic device. For example, suitable housings for portable computers are disclosed in U.S. Pat. Nos. 5,237,486 and 4,571,456 (the disclosures of which are incorporated by reference in their entireties).

Device 10 of FIG. 3 may be, for example, a handheld electronic device that supports 2G, 3G, and/or 4G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc. Device 10 may have a housing 12, or band. Antennas for handling wireless communications may be housed within housing 12 (as an example).

Housing 12, which is sometimes referred to as a case or band, can be fabricated from a bulk-solidifying amorphous alloy made in accordance with the embodiments described herein. In one embodiment, one or more portions of the housing may be processed to form a part of the antennas in device 10. For example, metal portions of housing 12 may be shorted to an internal ground plane in device 10 to create a larger ground plane element for that device 10.

Housing 12 may have a bezel 14. The bezel 14 may be formed of a conductive material or other suitable material. Bezel 14 may serve to hold a display or other device with a planar surface in place on device 10 and/or may serve to form an esthetically pleasing trim around the edge of device 10. As shown in FIG. 3, for example, bezel 14 may be used to surround the top of display 16. Bezel 14 and/or other metal elements associated with device 10 may be used as part of the antennas in device 10. For example, bezel 14 may be shorted to printed circuit board conductors or other internal ground plane structures in device 10 to create a larger ground plane element for device 10.

Display 16 may be a liquid crystal display (LCD), an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 3, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 3, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Port 20 may contain pins for receiving data and power signals. Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Forming the Intergral Housing and Transparent Member

To facilitate the formation of an overall housing of an electronic device, e.g., a cellular telephone or a digital media player, that includes a window or the like, an integral assembly may be formed to include the window. The integral assembly may be an overall housing in that the overall housing may include a glass member, or a plastic member, and the bulk-solidifying amorphous alloy. Alternatively, the integral assembly may be a part that is arranged to be assembled into an overall assembly, and may include a glass member, or a plastic member, and a bulk-solidifying amorphous alloy member. When the integral assembly is a part that is arranged to be assembled into the overall assembly, the bulk-solidifying amorphous alloy may effectively be a bezel 14 that is formed around the edge of a glass member 16, (FIG. 3). Although such a bezel may be formed from the bulk-solidifying amorphous alloy, or from another metal or alloy, a bezel may generally be formed from substantially any suitable material including, but not limited to including, a compliant material.

The overall housing is integral in that a transparent member and bulk-solidifying amorphous alloy, form a single, unified piece. A single, unified piece that includes a transparent member and a bulk-solidifying amorphous alloy typically are formed such that there are effectively no voids, gaps, or spaces between the transparent member and the metal. The transparent member and the bulk-solidifying amorphous alloy are substantially directly bonded together.

A variety of different methods may be used to form a bezel 14 around a transparent member 16. In one embodiment, shown in FIGS. 4 and 5, a housing 12 that can be formed to include a bezel 14, or bezel 14 can be added later is first fabricated. Any method of making a housing for an electronic device can be used. The housing 12, and optionally bezel 14, then can be heated to a temperature above the glass transition temperature, but below the crystallization temperature of the bulk-solidifying amorphous alloy, and elongated in the directions of x and y in FIG. 4. Elongation can be by application of an external force, or can be accomplished by insertion into an expandable mold that expands housing 12 in the x and y directions in the directions of arrows x and y. Use of a mold provide an advantage that heat can be continuously supplied to housing 12 to maintain it in its thermoplastic state by supplying heat to the mold apparatus.

Figure 4:
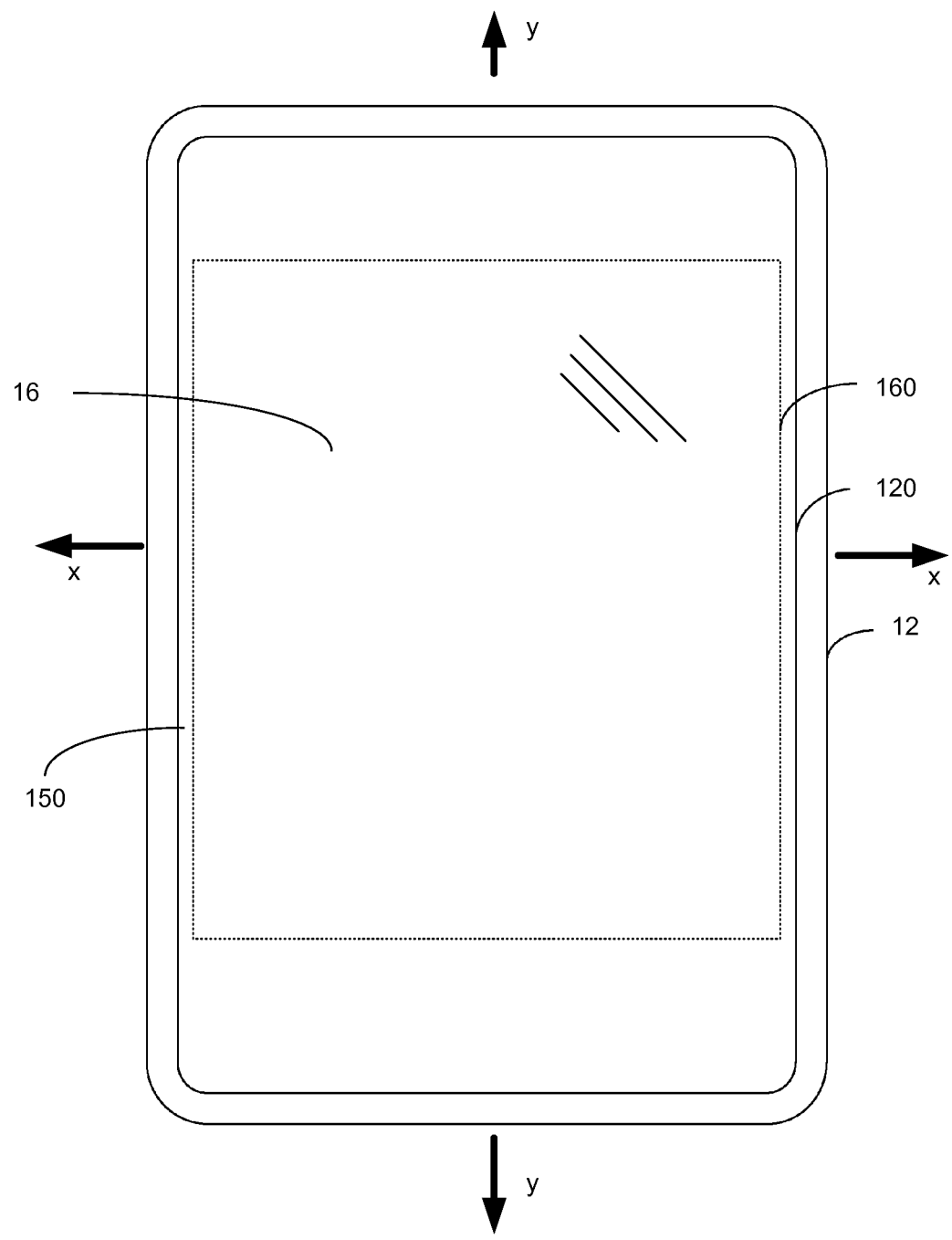
FIG. 4 shows a schematic of an illustrative method that may be used for forming a bezel around a transparent member.

Transparent member 16, which may be a glass, plastic, or any suitable transparent member, then can be positioned within elongated housing 12 such that a space 150 exists between the outer surface 160 of transparent member 16, and inners surface 120 of housing 12. FIG. 4 illustrates transparent member 16 traversing only a portion of the longitudinal axis (y) of housing 12, but it will be appreciated that transparent member could be positioned over the entire surface, or over a smaller surface than that illustrated in FIG. 4.

Figure 5:
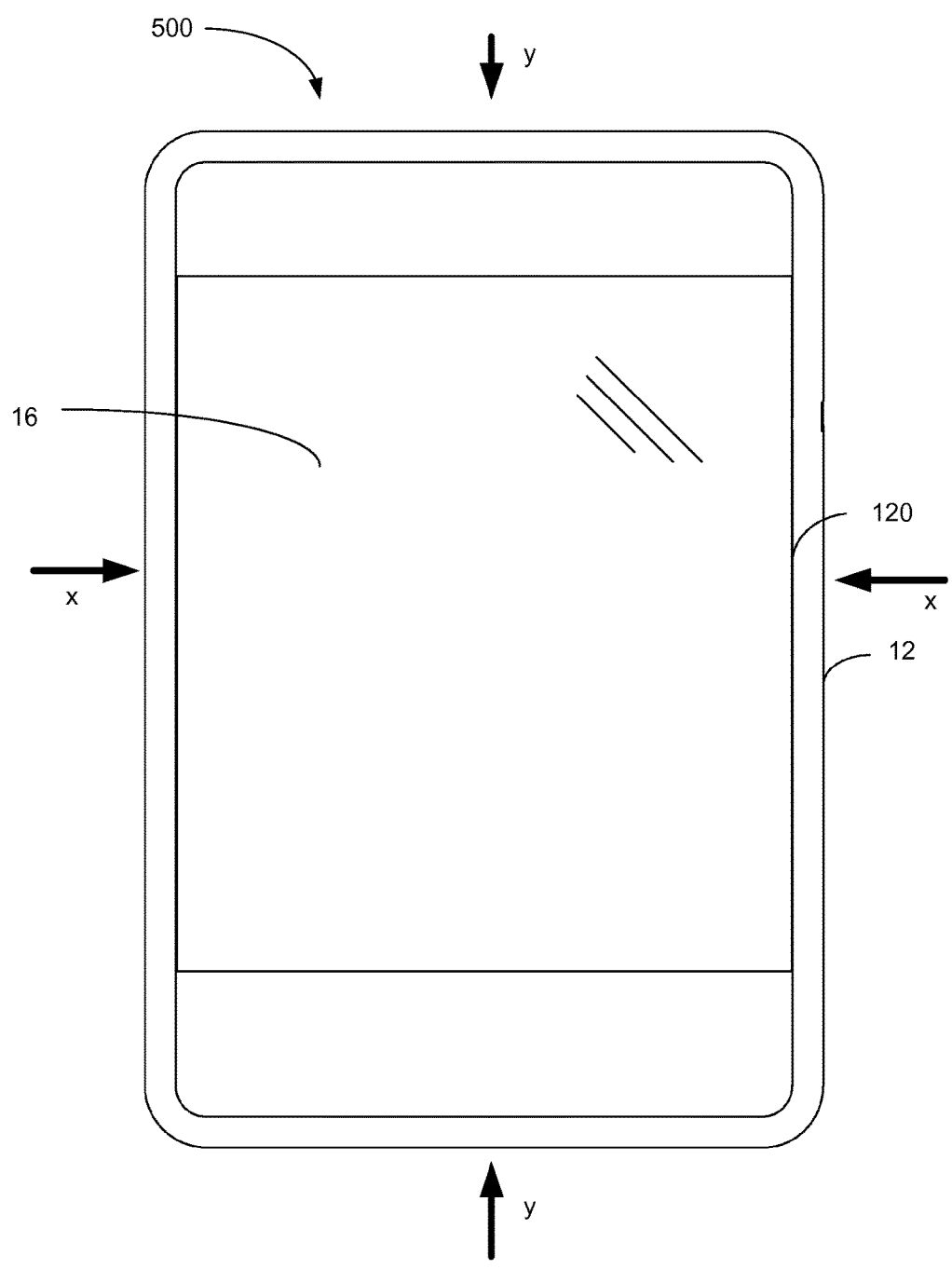
FIG. 5 shows another schematic of an illustrative method that may be used for forming a bezel around a transparent member.

Upon proper placement of transparent member 16, the external force that caused elongation of housing 12 may be removed and due to the superior elongation characteristics of the bulk-solidifying amorphous alloy used to fabricate housing 12, housing 12 will snap back into place in the directions of arrows x and y in FIG. 5 to fully integrate with transparent member 16. In addition, an external force also may be applied in the direction of arrows x and y to force housing 12 into position. Once in position, the space 150 no longer exists and the exterior surface 160 of transparent member 16 is welded together and becomes one with the internal surface 120 of housing 12 thereby forming an air-tight, fluid-tight seal.

Once sealed, housing 12 can be cooled to room temperature. Owing to the characteristics of the bulk-solidifying amorphous alloy, and only heating the housing to below its crystallization temperature, cooling need not be as rapid as that required when a bulk-solidifying amorphous alloy goes from the melt state to cooled state, as shown in FIG. 2. This provides a unique advantage insofar as transparent member 16 need not be subjected to such severe heating temperatures as would be encountered with a molten metal or alloy, nor is transparent member 16 subjected to rapid cooling if an amorphous metal alloy were used. Accordingly, there is significantly less stress on transparent member 16, thereby avoiding stress cracks, fissures, fractures, and the like that might otherwise occur.

Once cooled, a single part 500 containing a housing 12 (and optional bezel 14—not shown in FIG. 5) and a transparent member 16 is created. The single part may be, in one embodiment, an integral glass and metal alloy assembly or, more generally, an integral assembly 500. In one example, the alloy member may be a portion of a housing of an electronic device and the transparent member may be a window of an electronic device. The window may be a protective shield that covers a display or touch screen, or it may be substantially integral with a display or touch screen.

The formation of a bezel 14 around a transparent member 16 (FIG. 3) substantially eliminates tolerance issues associated with the bezel and the transparent member. Because the material (e.g., bulk-solidifying amorphous alloy) used in the bezel is provided in a thermoplastic phase around the transparent member, there is effectively no tolerance that has to be maintained with respect to the bezel. The thermoplastic phase alloy is formed around the edge of the transparent member, and when solidified, effectively grabs and adheres to the transparent member.

Preparing a transparent member 16 for use in the embodiments may include creating retaining features at the edges of the transparent member. Transparent member may be glass, plastic, fully transparent, slightly opaque, opaque, or may generally be dark unless back-lit by the lighted elements beneath the display. The retaining features provide areas where the bulk-solidifying amorphous alloy can be formed, thereby increasing the strength of the coupling between the two materials. By way of example, the retaining features may be protrusions and/or voids formed in the edges of the transparent member, as disclosed, for example, in U.S. Patent Application Publication No. 2009/0017263, the disclosure of which is incorporated by reference herein in its entirety. The protrusions and voids may include undercuts to further aid in coupling by providing features to which the bulk-solidifying amorphous alloy may be formed around. The retaining features may be widely varied. For instance, the retaining features may be macro or micro, and a variety of techniques may be used to create such macro or micro retaining features. The retaining features may be formed using techniques including, but not limited to including, etching, machining, microperfing, and the like. Examples of retaining features include cavities and protrusions, the shape and size of which are not critical to the embodiments.

After formation of the integral assembly 500, the assembly may be further processed using a finishing technique, including one or more of sandblasting the integral assembly 500 or some portion thereof, grinding the integral assembly 500 or some portion thereof, machining the integral assembly 500 or some portion thereof, polishing the integral assembly 500 or some portion thereof, adding coatings to the integral assembly 500 or some portion thereof, and the like. In general, finishing may be performed with respect to the integral assembly 500 such that finishing techniques are performed individually on the bulk-solidifying amorphous alloy housing 12, and on the transparent member 16, or such that finishing techniques may be performed on both the members.

Once finished, the integral assembly 500 may be assembled into an electronic device. In one example, the bulk solidifying amorphous alloy is a housing component of an electronic device, while the transparent member is arranged to form a window or a screen of the electronic device. The process of forming an integral assembly is essentially completed once the integral assembly 500 is assembled into an electronic device. The bulk-solidifying amorphous alloy may form all or some portion of the entire housing of the electronic device (e.g., all or some portion of a bezel). Other portions of the housing may be fabricated from other materials joined to the bulk-solidifying amorphous alloy, including fillers, more ductile materials and coatings, metal foams, and the like. The bulk-solidifying amorphous alloy housing may include retention features for attachment to other portions of a housing of the electronic device. These retention features may include, but are not limited to including, snap features, fasteners, or the like. The retention features may be molded, pre-formed, or they may be formed in post processing, as for example through machining the alloy or welding or otherwise attaching the features to the metal member.

In one embodiment, an intermediate member may be formed between the transparent member 16 and the bulk-solidifying amorphous metal member, e.g., a bezel, of an overall assembly. Such an intermediate member may be arranged to prevent a transparent member from coming into contact with a metal member when the transparent member is effectively supported by the metal member, e.g., when a glass window is support by a bezel or housing in an overall assembly. An intermediate member may also be arranged to serve as a shock absorbing layer in the event that a device that includes an overall assembly is dropped.

An intermediate member between a transparent member and a metal member may be formed from any suitable compliant material. The compliant material may be applied to the edges of a transparent member and/or appropriate areas on the bulk-solidifying amorphous alloy. Compliant materials include, but are not limited to including, silicon, rubber, thermoplastic elastomers (TPEs), metal foils, bulk-solidifying amorphous alloy foils, or the intermediate member may be a form, e.g., a form made from foam, that is placed around the edges of the transparent member. In the case of metal foils, the intermediate member may be heated to essentially melt or thermally deform the metal foil, and then the bulk-solidifying amorphous alloy and transparent member brought into intimate contact with one another. The intermediate member serves to provide a better seal between the two materials.

Figure 6:
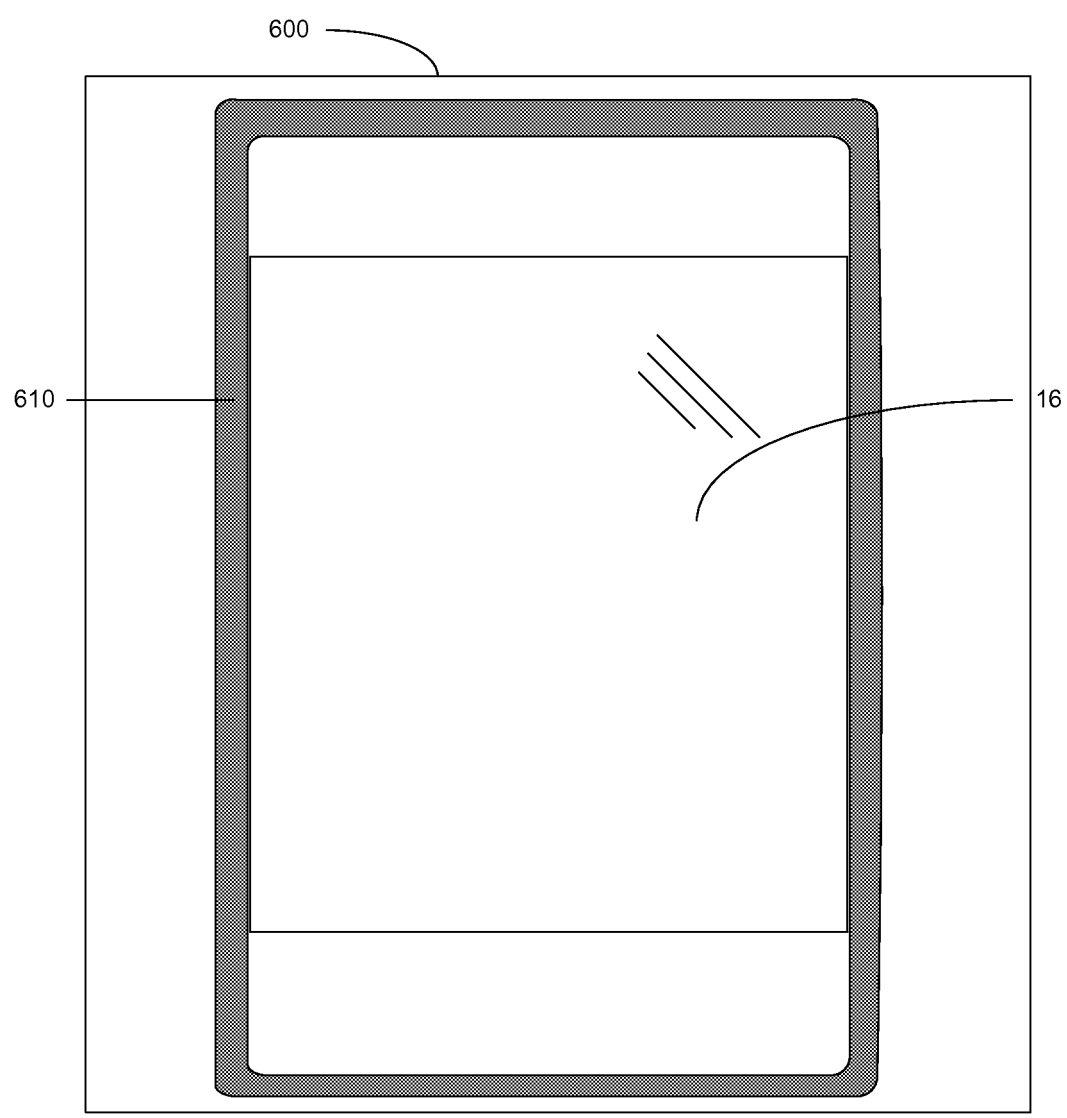
FIG. 6 shows a schematic of an illustrative method that may be used for forming the integral housing and transparent member.
Figure 7:
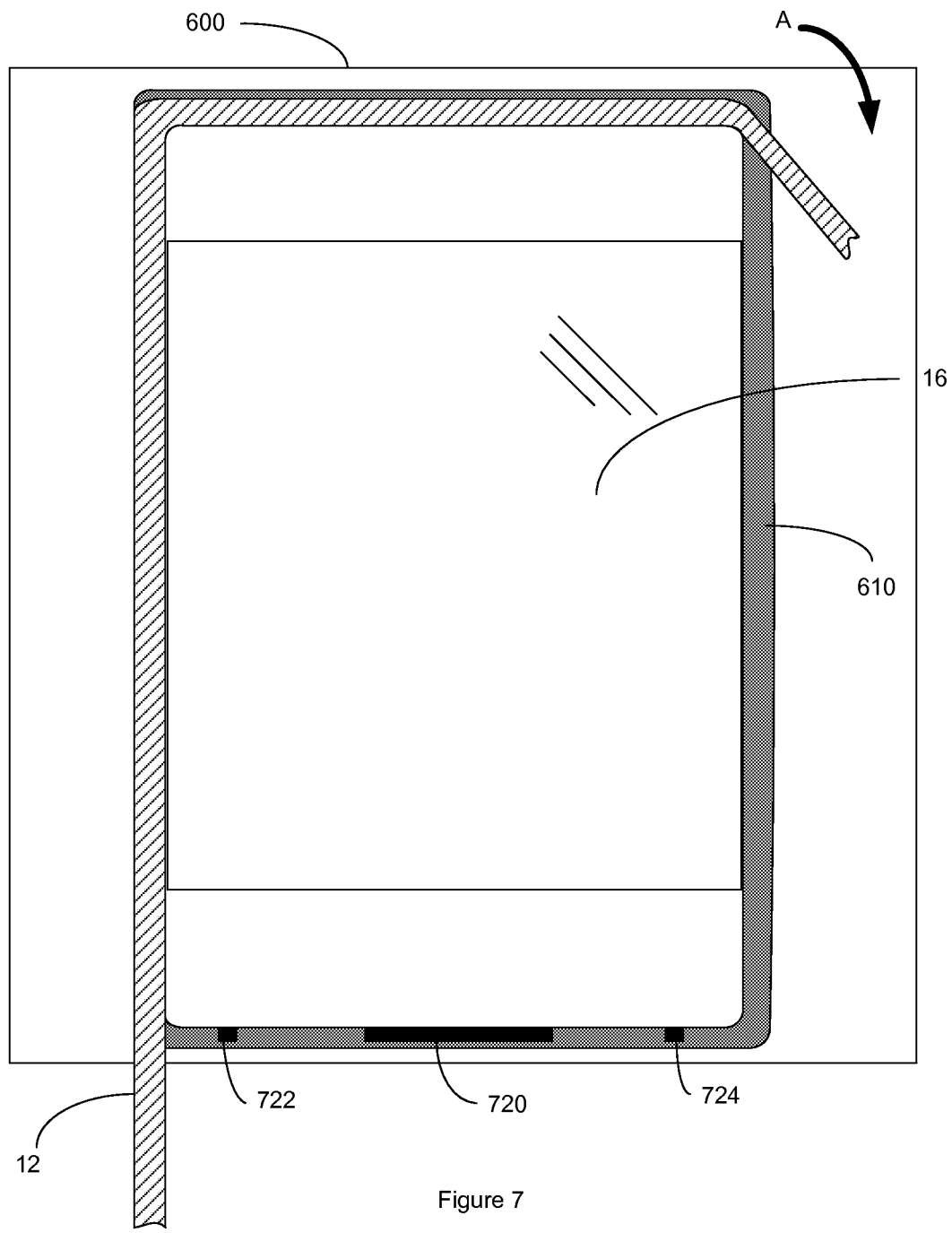
FIG. 7 shows another schematic of an illustrative method that may be used for forming the integral housing and transparent member.

Another embodiment for forming the integral housing and transparent member is shown in FIGS. 6 and 7. In this embodiment, a bulk-solidifying amorphous alloy can be provided in the form of a sheet or rod or band and then heated and formed around the transparent member. A mold apparatus 600 can be used, although not necessary, to form the bulk-solidifying housing around the transparent member 16. As shown in FIG. 6, mold assembly 600 may include a surface onto which transparent member 16 can placed. Surrounding that surface can be a groove or trench 610 into which the bulk-solidifying amorphous alloy material may be positioned to form a band around transparent member 16.

In accordance with this embodiment, the bulk-solidifying amorphous alloy band 12 is heated to a temperature above its glass transition temperature and below its crystallization temperature so that it can be themoplastically deformed. Because the band 12 is not heated past its crystallization temperature, the alloy remains substantially in its amorphous state, and despite being amorphous, can be easily formed into a variety of shapes and sizes. As shown in FIG. 7, the heated bulk-solidifying amorphous alloy band 12 can be positioned in groove or trench 610 and bent around transparent member 16 as shown by the direction of arrow A. Once completely surrounding transparent member 16, any excess band 12 can be cut and joined to the remainder of the band by further heating or using other conventional joining techniques to form a seamless bulk-solidifying amorphous alloy housing 12.

The bulk-solidifying amorphous alloy housing 12 then can be further processed as described above. In addition to the further processing, the various ports 20, 22, 24 (FIG. 3) can be formed into housing 12 by stamping, punching, slitting, cutting, or any other known technique capable of forming a suitable through-hole. Alternatively, mold apparatus 600 may include protrusions in groove or trench 610 may include protrusions 720, 722, 724 around which band 12 can be stretched and formed to form ports 20, 22, 24, respectively. Transparent member 16 also may include protrusions or cavities, as discussed above, to assist in joining the respective members together. There also may be present an intermediate member, as discussed above, to further facilitate joining the transparent member 16 and the bulk-solidifying amorphous alloy housing 12, or bezel 14.

Additional processing may be carried out on the bulk-solidifying amorphous alloy housing and integral transparent member using the stamping and die-forming techniques, typically performed around the glass transition temperatures, as described in U.S. Pat. Nos. 5,324,368, 5,896,642, and 6,771,490 (each of whose disclosures is incorporated by reference in its entirety). In addition, the integral assembly 500 may be machined, cut, stamped or die-formed with various slots and holes to provide improved cooling for the heat generated from the operation of electronic hardware, flat panel display, and the like. In such an embodiment, the integral assembly 500 may also be machined, cut, stamped or die-formed with various slots and holes to provide improved performance for internal sound system and speakers. Finally, in another such embodiment, the integral assembly 500 may be machined, cut, stamped or die-formed with various slots and holes to provide space for keyboard, mouse, track pad and other various accessories and other such attachments.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A method of forming an integrally formed transparent member and amorphous metal alloy-containing housing assembly comprising:
   preparing a housing comprising an amorphous solid from a bulk-solidifying amorphous alloy;
   heating the housing comprising the amorphous solid to above a glass transition temperature but below a crystallization temperature and below a melting temperature of the bulk-solidifying amorphous alloy;
   expanding the heated housing;
   positioning a transparent member within the expanded housing;
   contracting the housing around the transparent member; and
   cooling the housing and transparent member to form an integrally formed transparent member and amorphous metal alloy-containing housing comprising the bulk-solidifying amorphous alloy.

2. The method as claimed in claim 1, wherein expanding the heated housing comprises applying an external force in at least one direction to expand the housing in at least one direction.

3. The method as claimed in claim 2, wherein contracting comprises removing the external force.

4. The method as claimed in claim 1, wherein the housing is maintained at a temperature above its glass transition temperature but below its crystallization temperature throughout the method until the cooling procedure.

5. The method of claim 1, wherein the transparent member is glass.

6. The method of claim 1, wherein the transparent member comprises at least one retaining feature, the retaining feature being positioned at an edge of the transparent member, the retaining feature being arranged to facilitate binding between the bulk amorphous alloy and the transparent member.

7. The method of claim 6, wherein the at least one retaining feature is a protrusion or a void.

8. The method of claim 1, wherein the bulk-solidifying amorphous alloy is at least about 98% amorphous.

9. The method as claimed in claim 1, wherein the bulk-solidifying amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

10. The method as claimed in claim 1, wherein the bulk-solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

11. The method as claimed in claim 1, wherein the bulk solidifying amorphous alloy can sustain strains up to 1.5% or more without any permanent deformation or breakage.

12. The method as claimed in claim 1, wherein the difference between the glass transition temperature and the crystallization temperature of the bulk-solidifying amorphous alloys is within the range of from about 40 to about 250° C.

13. A method of forming an integrally formed transparent member and amorphous metal alloy-containing housing assembly comprising:
   providing a band, at least a portion of which is comprised of a bulk-solidifying amorphous alloy;
   heating the band to a temperature above the glass transition temperature but below the crystallization temperature of the bulk-solidifying amorphous alloy;
   placing a transparent member in a mold apparatus;
   wrapping the heated band around the transparent member;
   optionally applying pressure to the heated band and transparent member to mold the band around the transparent member to form a housing integral with a transparent member; and
   cooling the housing and transparent member to form an integrally formed transparent member and amorphous metal alloy-containing housing.

14. The method as claimed in claim 13, wherein the band is maintained at a temperature above the glass transition temperature but below the crystallization temperature of the bulk-solidifying amorphous alloy throughout the method until the cooling procedure.

15. The method of claim 13, wherein the transparent member is glass.

16. The method of claim 13, wherein the transparent member comprises at least one retaining feature, the retaining feature being positioned at an edge of the transparent member, the retaining feature being arranged to facilitate binding between the bulk amorphous alloy and the transparent member.

17. The method as claimed in claim 13, wherein the bulk-solidifying amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

18. The method as claimed in claim 13, wherein the bulk-solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

19. The method as claimed in claim 13, wherein the bulk solidifying amorphous alloy can sustain strains up to 1.5% or more without any permanent deformation or breakage.

20. The method as claimed in claim 13, wherein the difference between the glass transition temperature and the crystallization temperature of the bulk-solidifying amorphous alloys is within the range of from about 40 to about 250° C.

21. A method of forming an integrally formed transparent member and amorphous metal alloy-containing housing assembly comprising:
   preparing a housing from at least a portion of a bulk-solidifying amorphous alloy;
   heating the housing to above its glass transition temperature but below its crystallization temperature;
   expanding the heated housing;
   positioning a transparent member within the expanded housing;
   providing an intermediate member positioned either around the transparent member or within the expanded heated housing such that the intermediate member is positioned between the transparent member and the expanded housing;
   contracting the housing around the transparent member and intermediate member; and
   cooling the housing and transparent member to form an integrally formed transparent member and amorphous metal alloy-containing housing.

22. The method of claim 21, wherein the intermediate member is selected from the group consisting of a silicon, a rubber, a thermoplastic elastomer, a metal or metal alloy foil, and combinations thereof.

23. The method of claim 21, further comprising additionally heating the intermediate member after providing the intermediate member.

24. The method of claim 21, further comprising applying a compressive force to the housing after contracting the housing around the transparent member and intermediate member.

25. A method of forming an integrally formed transparent member and amorphous metal alloy-containing housing assembly comprising:
   providing a band, at least a portion of which is comprised of a bulk-solidifying amorphous alloy;
   heating the band to a temperature above the glass transition temperature but below the crystallization temperature of the bulk-solidifying amorphous alloy;
   placing a transparent member in a mold apparatus; positioning an intermediate member either around the transparent member or adjacent the heated band;
   wrapping the heated band around the transparent member such that the intermediate member is positioned between the transparent member and the band;
   optionally applying pressure to the heated band, transparent member and intermediate member to mold the band around the transparent member to form a housing integral with a transparent member; and
   cooling the housing, intermediate member, and transparent member to form an integrally formed transparent member and amorphous metal alloy-containing housing.

26. The method of claim 25, wherein the intermediate member is selected from the group consisting of a silicon, a rubber, a thermoplastic elastomer, a metal or metal alloy foil, and combinations thereof.

27. The method of claim 21, further comprising additionally heating the intermediate member after positioning the intermediate member.

* * * * *